(12) United States Patent
Mic et al.

(10) Patent No.: US 6,719,367 B2
(45) Date of Patent: Apr. 13, 2004

(54) SLIDING ARM-REST CONSOLE ASSEMBLY

(75) Inventors: Marcel S. Mic, Utica, MI (US); Anil Rajubhai Bhogesara, Pune (IN); James Axiotis, Auburn Hills, MI (US)

(73) Assignee: General Motors Corporation, Detroit, MI (US)

( * ) Notice: Subject to any disclaimer, the term of this patent is extended or adjusted under 35 U.S.C. 154(b) by 112 days.

(21) Appl. No.: 10/112,604

(22) Filed: Mar. 27, 2002

(65) Prior Publication Data

US 2003/0184133 A1 Oct. 2, 2003

(51) Int. Cl.[7] .................................................. A47C 7/62
(52) U.S. Cl. ............................ 297/188.19; 297/188.14; 297/411.21; 297/115; 296/37.8
(58) Field of Search ........................... 297/115, 188.14, 297/188.19, 411.21; 296/37.8, 97.11; 312/324

(56) References Cited

U.S. PATENT DOCUMENTS

| | | | | |
|---|---|---|---|---|
| 5,845,965 A | * | 12/1998 | Heath et al. | 297/188.19 |
| 6,045,173 A | * | 4/2000 | Tiesler et al. | 296/37.8 |
| 6,203,088 B1 | * | 3/2001 | Fernandez et al. | 296/37.8 |
| 6,419,314 B1 | * | 7/2002 | Scheerhorn | 297/188.19 X |
| 6,435,587 B1 | * | 8/2002 | Flowerday et al. | 296/37.8 |

OTHER PUBLICATIONS

All Saturn 2000 Model Year vehicle armrests.
2000 Saturn S–series vehicle armrest console (drawings included).

* cited by examiner

Primary Examiner—Anthony D. Barfield
(74) Attorney, Agent, or Firm—Laura C. Hargitt

(57) ABSTRACT

A sliding arm-rest console assembly for a vehicle includes a console and a storage bin disposed within the console to allow objects to be stored therein. The assembly includes a stowage door pivotally connected to the console for opening and closing the storage bin in an open position and a closed position. The assembly further includes a sliding arm-rest disposed over the stowage door to slide between a retracted position over the stowage door and an extended position extending forward past the stowage door. A slide guide cooperates with the stowage door to latch the stowage door to the console in the closed position and cooperates with the sliding arm-rest to guide movement of the sliding arm-rest along the stowage door between the retracted position and the extended position when the stowage door is in the closed position.

21 Claims, 7 Drawing Sheets

SLIDING ARM-REST CONSOLE ASSEMBLY

TECHNICAL FIELD

The present invention relates generally to consoles for vehicles and, more particularly, to a sliding arm-rest console assembly for a vehicle.

BACKGROUND OF THE INVENTION

It is known to provide a console for a vehicle such as an automotive vehicle between driver and front passenger seats in the vehicle. The console has many functions. It may operate as an arm rest, a storage unit, a writing table, or cup holder.

One type of console having a sliding arm-rest has been used. In this console, a stowage door functioned to open and close a storage bin disposed inside the console and the sliding arm-rest slid longitudinally on the stowage door. The sliding arm-rest used a friction type of scheme, i.e. a metal clip grabbing onto polypropylene tabs on the stowage door. The tabs tend to wear easily and in some instances the metal clip was compromising its spring action forcing a change to its gage thickness. Also, a stowage arm-rest door could be pulled open even when the sliding arm-rest was in stretched or extended mode. The appearance appeal of this sliding arm-rest in extended or retracted mode was undesired along with the functionality, which was not robust.

Therefore, it is desirable to provide a new sliding arm-rest console that requires a user to retract the sliding arm before opening a stowage door of the console. It is also desirable to provide a sliding arm-rest console that has a better positive latch at no or very little additional cost. It is further desirable to provide a sliding arm-rest console for a vehicle that improves reliability of the latch. Therefore, there is a need in the art to provide a sliding arm-rest console assembly for a vehicle that meets these desires.

SUMMARY OF THE INVENTION

It is, therefore, one object of the present invention to provide a new sliding arm-rest console assembly for a vehicle.

It is another object to provide a sliding arm-rest console assembly for a vehicle that has a positive latch mechanism and requires a user to retract the sliding arm before opening the stowage door of the console.

To achieve the foregoing objects, the present invention is a sliding arm-rest console assembly for a vehicle. The sliding arm-rest console assembly includes a console for attachment to vehicle structure of the vehicle. The sliding arm-rest console assembly also includes a storage bin disposed within the console and having a cavity to allow objects to be stored therein. The sliding arm-rest console assembly includes a stowage door pivotally connected to the console for opening and closing the storage bin in an open position and a closed position. The sliding arm-rest console assembly also includes a sliding arm-rest disposed over the stowage door to slide between a retracted position over the stowage door and an extended position extending forward past the stowage door. The sliding arm-rest console assembly further includes a slide guide cooperating with the stowage door to latch the stowage door to the console in the closed position and cooperating with the sliding arm-rest to guide movement of the sliding arm-rest along the stowage door between the retracted position and the extended position when the stowage door is in the closed position.

One advantage of the present invention is that a new sliding arm-rest console assembly is provided for a vehicle. Another advantage of the present invention is that the sliding arm-rest console assembly requires a user to retract a sliding arm-rest before opening a stowage door on the console. Yet another advantage of the present invention is that the sliding arm-rest console assembly provides a better positive latch mechanism to ensure that the stowage door remains closed at no or very little additional cost. Still another advantage of the present invention is that the sliding arm-rest console assembly improves reliability in latching the sliding arm-rest to the console. A further advantage of the present invention is that the sliding arm-rest console assembly provides greater arm-rest travel-to-length ratio of approximately 0.38 versus 0.27 for conventional sliding arm rests. Yet a further advantage of the present invention is that the sliding arm-rest console assembly improves styling and appearance of the console.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
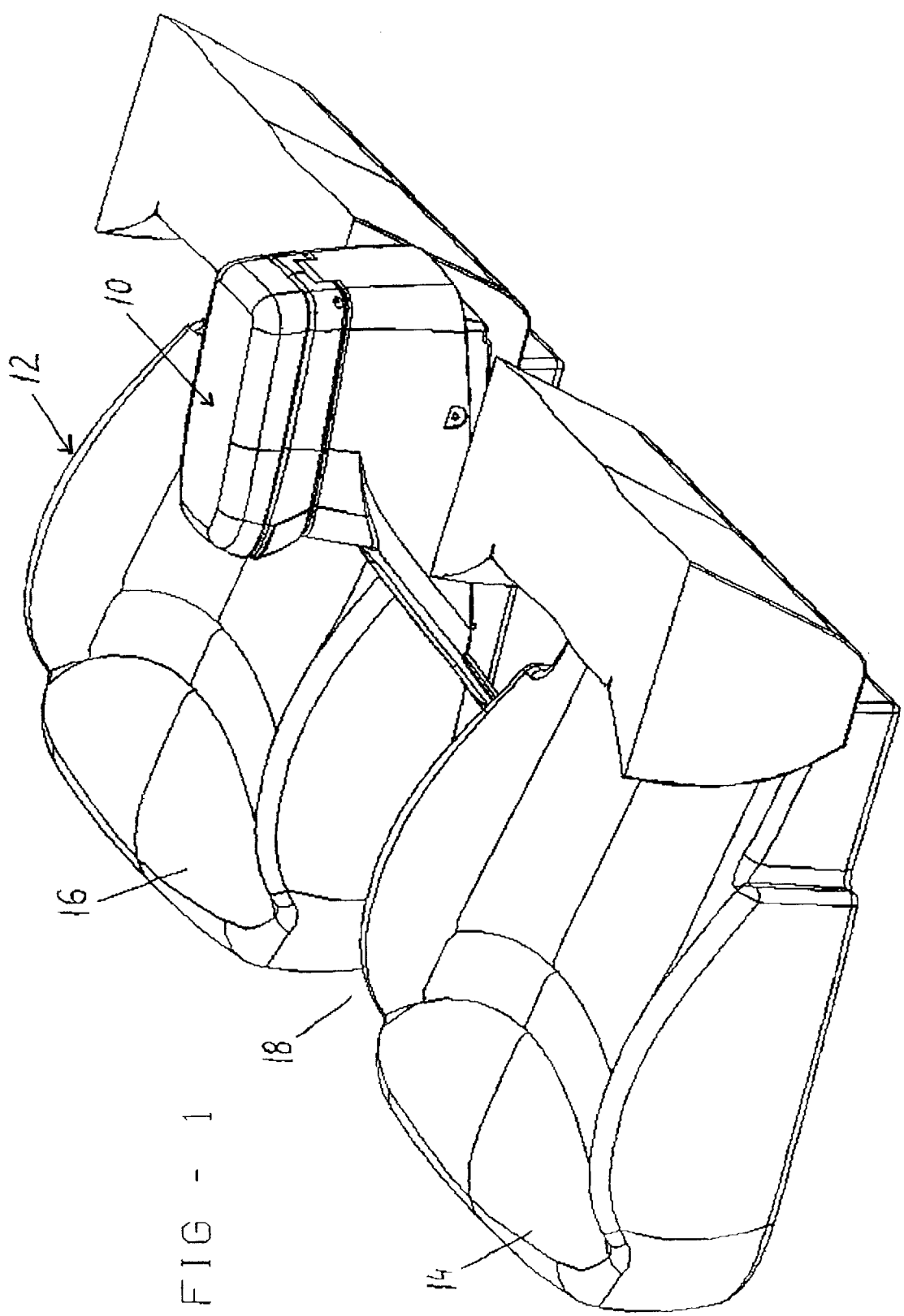
FIG. 1 is a perspective view of a sliding arm-rest console assembly, according to the present invention, illustrated in operational relationship with a vehicle.
Figure 2:
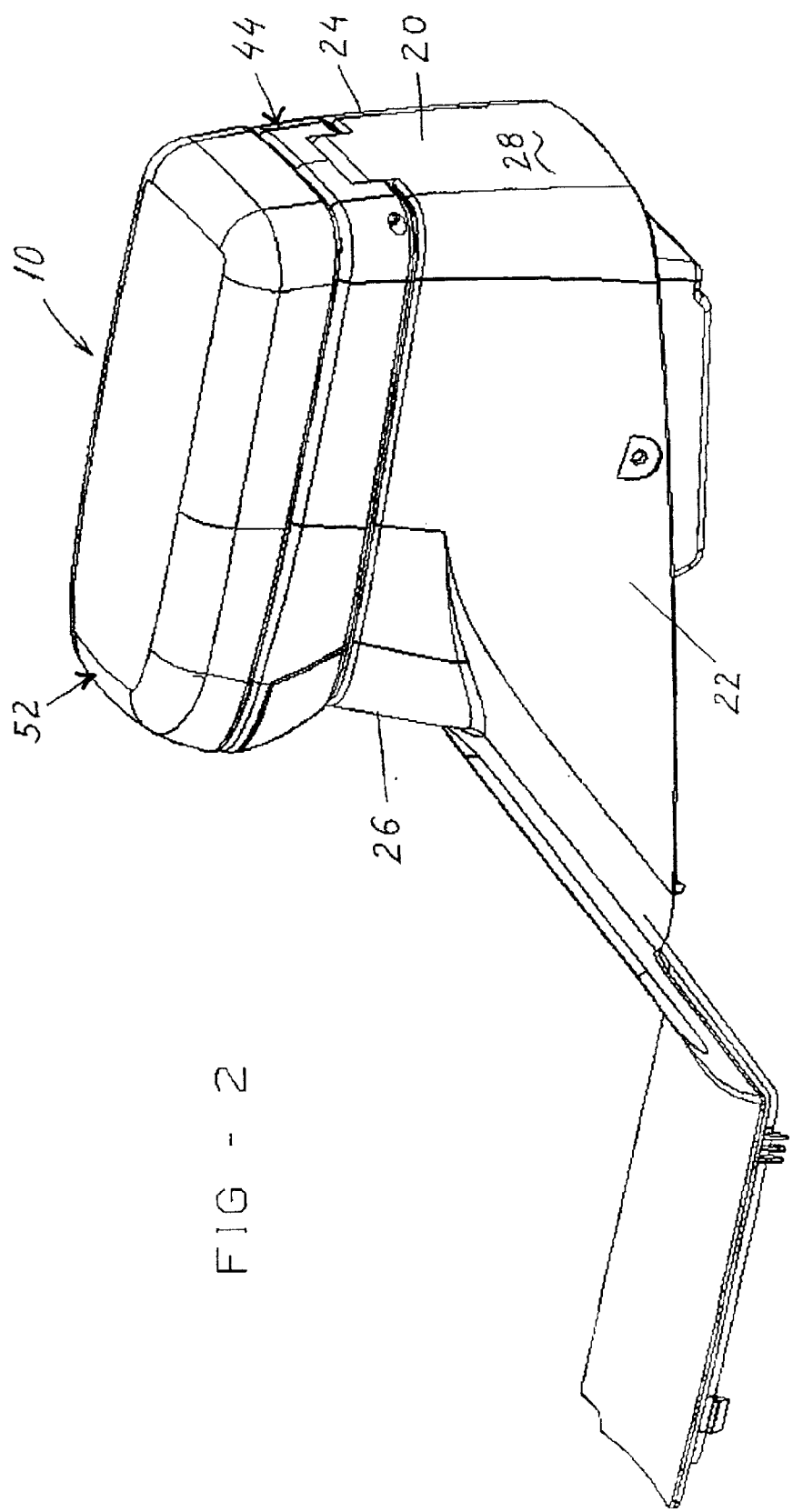
FIG. 2 is an enlarged perspective view of the sliding arm-rest console assembly of FIG. 1.
Figure 3:
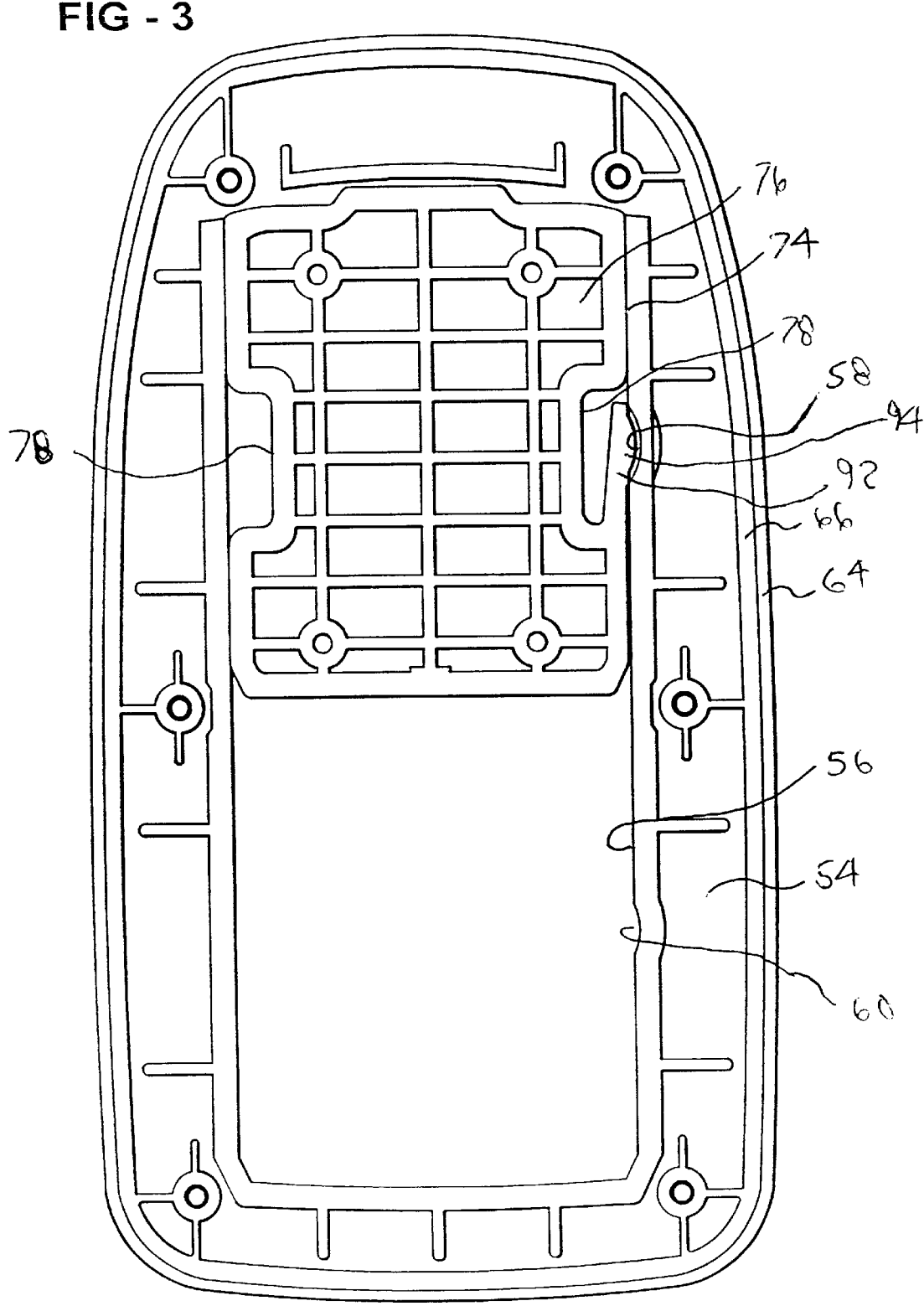
FIG. 3 is a bottom view of a sliding arm-rest of the sliding arm-rest console assembly of FIG. 2.

Referring to the drawings and in particular FIGS. 1 and 2, one embodiment of a sliding arm-rest console assembly 10, according to the present invention, is shown for a vehicle, such as an automotive vehicle, generally indicated at 12. The vehicle 12 includes the sliding arm-rest console assembly 10, according to the present invention, positioned between a driver seat 14 and a passenger seat 16 in an occupant compartment of the vehicle 12. The sliding arm-rest console assembly 10 as shown is generally elongated and rectangular in shape to fit in a space 18 between the seats 14 and 16. It should be appreciated that, except for the sliding arm-rest console assembly 10, the vehicle 12 is conventional and known in the art.

Figure 4:
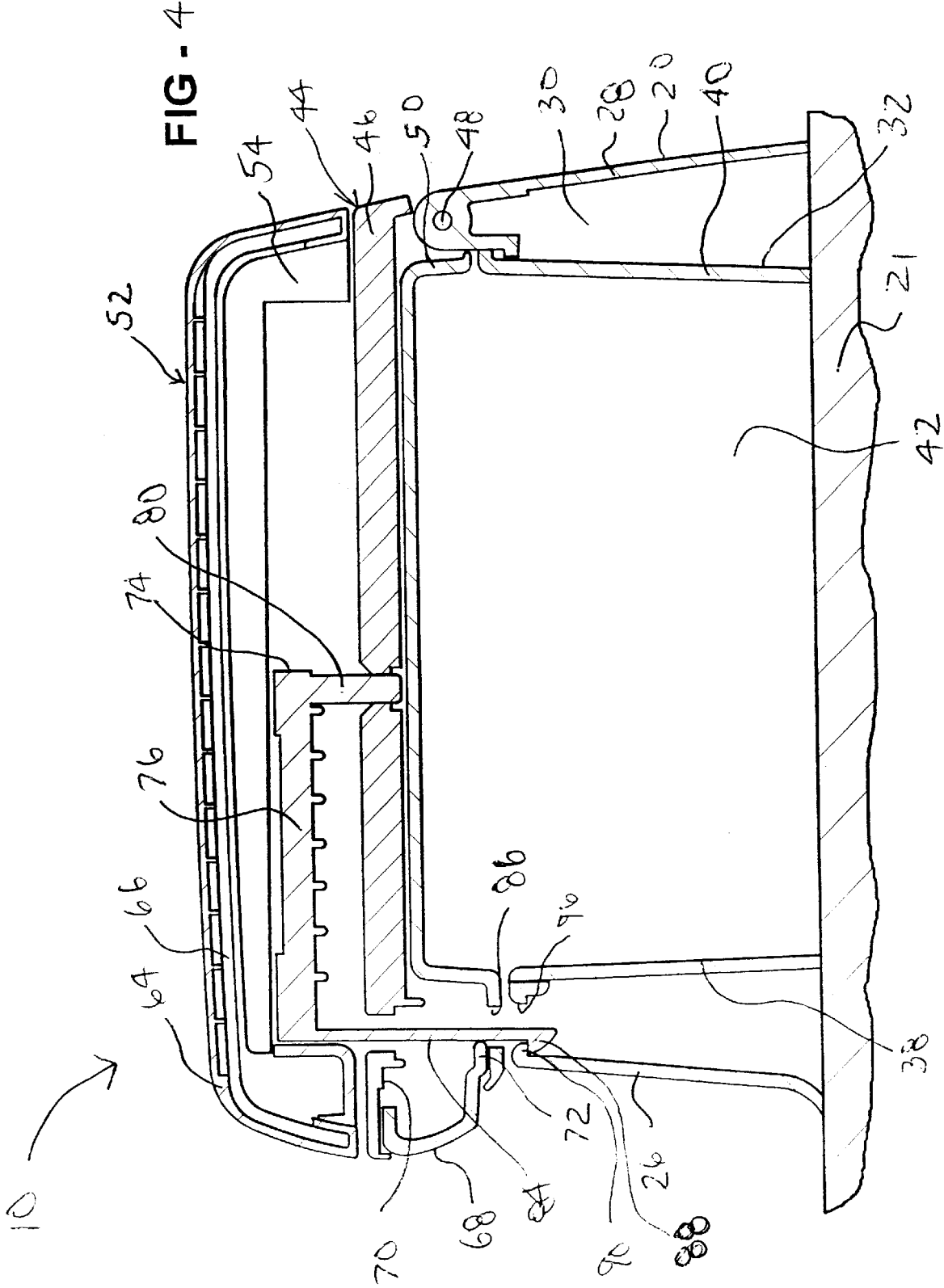
FIG. 4 is a fragmentary front elevational view of the sliding arm-rest console assembly of FIG. 2 illustrated in a first operative position.
Figure 7:
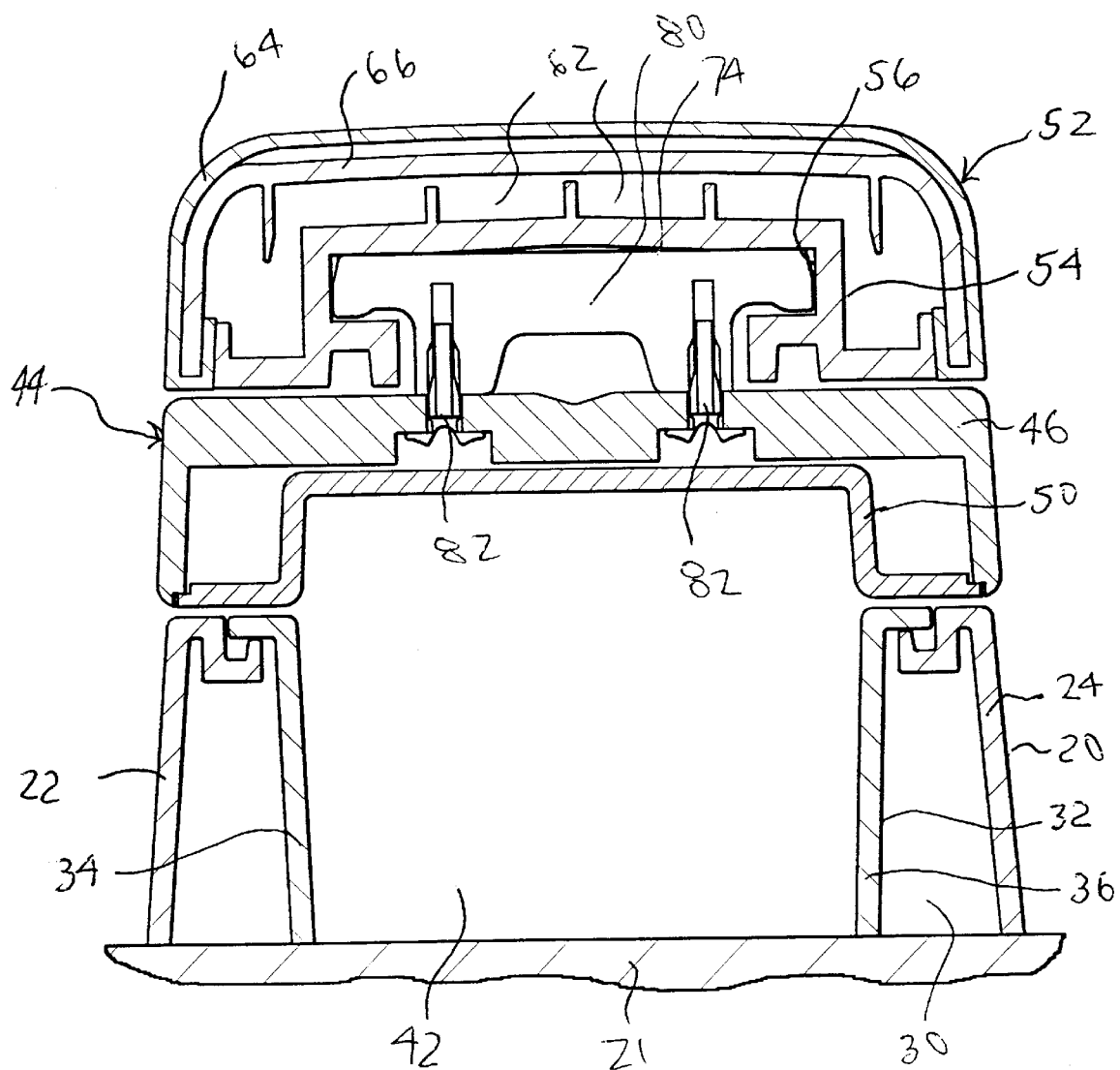
FIG. 7 is a fragmentary side elevational view of the sliding arm-rest console assembly of FIG. 2.

Referring to FIGS. 2, 4, and 7, the sliding arm-rest console assembly 10 includes a console 20. The console 20 is generally rectangular in shape. The console 20 is secured to vehicle structure such as a floor pan 21 of the vehicle by suitable means (not shown) and is fixed or stationary. The console 20 includes a bottom (not shown), a first side wall 22, a second side wall 24, a front end wall 26, and a rear end wall 28 to form a cavity 30 therein for a function to be described. The console 20 is made of a plastic material.

The sliding arm-rest console assembly 10 also includes a storage bin 32 disposed within the cavity 30 of the console 20. The storage bin 32 includes a bottom (not shown), a first side wall 34, a second side wall 36, a front end wall 38, and a rear end wall 40 to form a storage space or cavity 42 to store objects or articles therein. The storage bin 32 is made of a plastic material. It should be appreciated that the storage bin 32 is supported in the cavity 30 of the console 20 by cooperating flanges on the walls thereof.

The sliding arm-rest console assembly 10 further includes a stowage door, generally indicated at 44, pivotally connected to the rear of the console 20 for opening and closing the storage bin 32. The stowage door 44 includes a door member 46 extending longitudinally and transversely. The door member 46 is generally rectangular in shape. The door member 46 is pivotally connected to the rear end wall 28 by suitable means such as a pin 48. The stowage door 44 also includes a lid 50 attached to the door member 46 to cover the open end of the cavity 42 of the storage bin 32. The door member 46 and lid 50 are made of a plastic material. It should be appreciated that the door member 46 and lid 50 are attached together by cooperating flanges on the walls thereof to move as a single unit. It should be appreciated that the stowage door 44 is opened from front to back to allow access to the storage bin 32.

Referring to FIGS. 2 through 7, the sliding arm-rest console assembly 10 further includes a sliding arm-rest, generally indicated at 52, disposed over the stowage door 44 to support an arm of a user (not shown). The sliding arm-rest 52 includes a substrate 54 disposed adjacent the door member 46. The substrate 54 is generally rectangular in shape. The substrate 54 has an elongated channel 56 extending therein. The channel 56 is generally rectangular in shape. The channel 56 has a first recess 58 extending into the substrate 54 on one side thereof near a front longitudinal end thereof and a second recess 60 spaced longitudinally from the first recess 58 extending into the substrate 54 on the side thereof and near a rear longitudinal end thereof for a function to be described. The recesses 58 and 60 are generally arcuate in shape for a function to be described. The substrate 54 also has a plurality of channels 62 therein extending longitudinally for a cover to be described. The substrate 54 is made of a plastic material. It should be appreciated that the substrate 54 moves longitudinally relative to the door member 46.

The sliding arm-rest 52 also includes a cover 64 covering the substrate 54. The cover 64 is made of a relatively soft material such as Thermoplastic Polyolefin (TPO). The cover 64 may include a support member 66 attached thereto and attached to the substrate 54 by corresponding flanges. The support member 66 is made of a plastic material. It should be appreciated that the support member 66 and cover 64 are spaced from the channels 62 to provide a cushioned surface interface.

The sliding arm-rest console assembly 10 includes a movable handle 68 disposed in a cavity 70 in a forward end of the stowage door 44. The handle 68 is generally rectangular in shape. The handle 68 has a lip 72 extending longitudinally rearwardly for a function to be described. The handle 68 is pivotally connected to the substrate 54 by suitable means (not shown).

The sliding arm-rest console assembly 10 includes a slide guide 74 for guiding the sliding arm-rest 52 and latching the stowage door 44 to the console 20. The slide guide 74 has a base portion 76 that is generally rectangular in shape. The base portion 76 extends longitudinally and transversely and is disposed in the channel 56 of the substrate 54. The base portion 76 includes a recess 78 on opposed sides thereof for a function to be described.

The slide guide 74 also includes a rear attachment portion 80 extending generally perpendicular from the base portion 76. The rear attachment portion 80 extends downwardly and is secured to the door member 46 by suitable means such as fasteners 82.

The slide guide 74 includes a front latch portion 84 extending generally perpendicular from the base portion 76. The latch portion 84 extends downwardly through an aperture 86 in the lid 50. The latch portion 84 has a flange 88 at a free end thereof extending longitudinally to engage a flange 90 on the front end wall 26 of the console 20. It should be appreciated that the latch portion 84 flexes to engage and disengage the console 20. It should also be appreciated that the lip 72 on the handle 68 is moved inwardly to flex and move the latch portion 84 such that the flange 88 disengages the flange 90. It should further be appreciated that the latch portion 84 has spring or memory properties to return to its original position when the lip 72 on the handle 68 disengages the latch portion 84.

The slide guide 74 further includes an arm portion 92 extending from the base portion 76 into one of the recesses 78. The arm portion 92 extends longitudinally from one end of the recess 78 and is spaced from the base portion 76 at the other end. The arm portion 92 includes a flange 94 extending outwardly from a free end thereof for cooperating with the recesses 58,60 of the substrate 54. The flange 94 has a generally arcuate shape to cooperate with and be disposed in the recesses 58,60 of the channel 56 of the substrate 54. It should be appreciated that the arm portion 92 is pivoted inwardly into the recess 78 when the substrate 54 is moved relative to the slide guide 76 by interaction of the flange 94 with the recess 58,60 on the substrate 54. It should also be appreciated that the arm portion 92 flexes to engage and disengage the recess 58,60 and has spring or memory properties to return to its original position when the flange 90 is aligned with one of the recesses 58,60 in the substrate 54.

In operation of the sliding arm-rest console assembly 10, the sliding arm-rest 52 is in a retracted mode or position as illustrated in FIG. 4. In this position, the stowage door 44 is in a closed position and the lid 50 covers the open end of the storage bin 32. The latch portion 84 of the slide guide 74 engages the console 20. Also, the flange 94 on the arm portion 92 of the slide guide 74 is disposed in the first recess 58 of the substrate 54. In this position, an arm of a user can rest on the cover 64 in a manner similar to conventional arm-rests.

Figure 5:
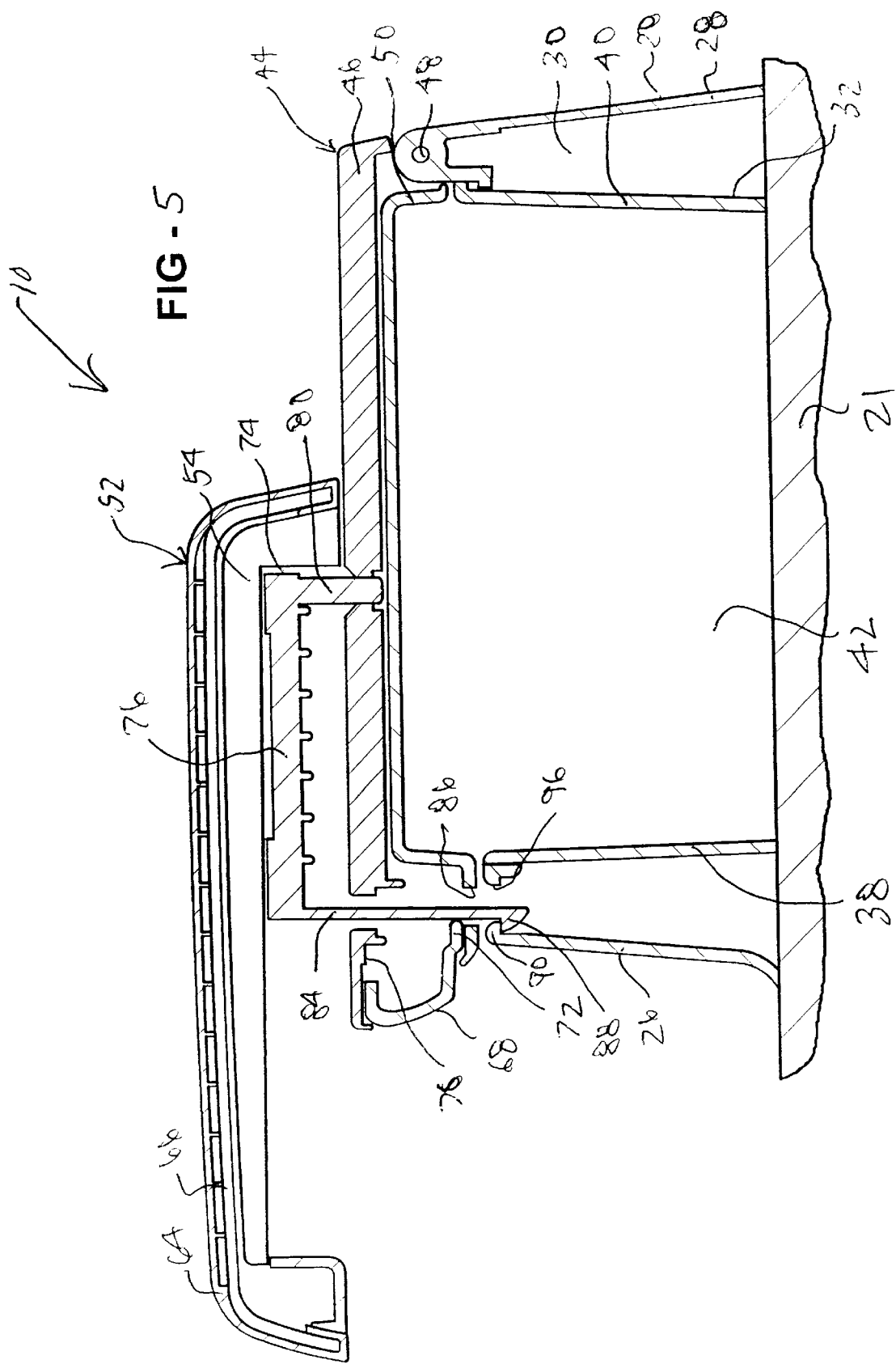
FIG. 5 is a view similar to FIG. 4 of the sliding arm-rest console assembly of FIG. 2 illustrated in a second operative position.

As illustrated in FIG. 5, the sliding arm-rest 52 may be moved to an extended mode or position. To move the sliding arm-rest 52 to this position, the user applies a predetermined force to the sliding arm-rest 52. The interaction between the first recess 58 of the substrate 54 and the flange 94 on the arm portion 92 of the slide guide 74 causes the arm portion 92 to deflect inwardly into the recess 78 of the base portion 76. This allows the substrate 54 to move longitudinally forward. The sliding arm-rest 52 is extended until the second recess 60 of the substrate 54 is aligned with the flange 94 on the arm portion 92 of the slide guide 74. When this occurs, the arm portion 92 returns to its original position to dispose the flange 94 in the second recess 60 of the substrate 54. It should be appreciated that the operation may be reversed.

Figure 6:
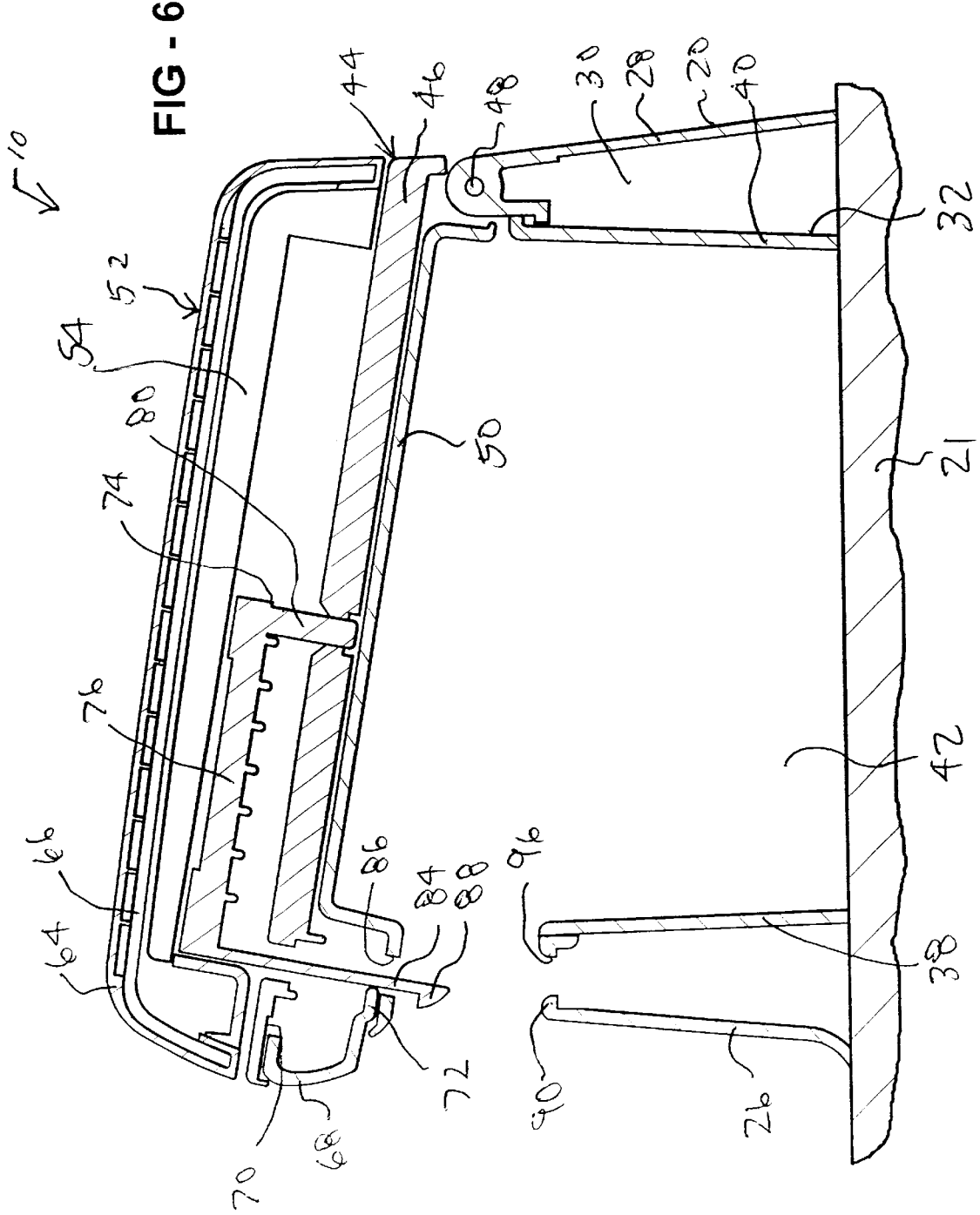
FIG. 6 is a view similar to FIG. 4 of the sliding arm-rest console assembly of FIG. 2 illustrated in a third operative position.

As illustrated in FIG. 6, when the sliding arm-rest 52 is in the retracted mode, the stowage door 44 may be articulated relative to the console 20 to open and close the storage bin 32. To move the stowage door 44 to an open position, the user pivots the handle 68 inwardly and the lip 72 engages the latch portion 84 of the slide guide 74. The latch portion 84 flexes inwardly and the flange 88 disengages the flange 90 of the console 20. The user moves or pivots the stowage door 44 upwardly such that the latch portion 84 exits an aperture 96 between the console 20 and the storage bin 32 to open the storage bin 32 to allow access thereto. The operation is reversed for moving the stowage door 44 to the closed position.

Accordingly, the sliding arm-rest console assembly 10 is an arm-rest system/module, which provides storage closeout and functions as an arm-rest support that slides forward with a predetermined effort. The sliding arm-rest console assembly 10 offers a large range of arm-rest support for different users and allows the amount of arm-rest travel to be easily increased or decreased. The arm-rest travel to length ratio of 0.38 (80 mm of travel for 213 mm long arm-rest) is forty percent (40%) higher than conventional sliding arm-rests. The wide channel to guide contact ratio provides a very sturdy and solid forward motion. The slide guide 74 also functions as a positive latch mechanism.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A sliding arm-rest console assembly for a vehicle comprising:
   a console for attachment to vehicle structure of the vehicle;
   a storage bin disposed within said console and having a cavity to allow objects to be stored therein;
   a stowage door pivotally connected to said console for opening and closing said storage bin in an open position and a closed position;
   a sliding arm-rest disposed over said stowage door to slide between a retracted position over said stowage door and an extended position extending forward relative to said stowage door; and
   a slide guide cooperating with said stowage door to latch said stowage door to said console in said closed position and cooperating with said sliding arm-rest to guide movement of said sliding arm-rest along said stowage door between said retracted position and said extended position when said stowage door is in said closed position.

2. A sliding arm-rest console assembly as set forth in claim 1 wherein said slide guide comprises a base portion, a rear attachment portion extending from said base portion, and a front latch portion extending from said base portion.

3. A sliding arm-rest console assembly as set forth in claim 2 wherein said front latch portion includes a flange extending outwardly to engage a portion of said console when said stowage door is in said closed position.

4. A sliding arm-rest console assembly as set forth in claim 2 wherein said slide guide has at least one recess extending into said base portion.

5. A sliding arm-rest console assembly as set forth in claim 4 wherein said slide guide has at least one flexible arm portion extending into said at least one recess.

6. A sliding arm-rest console assembly as set forth in claim 5 wherein said slide guide has a flange extending outwardly from said at least one flexible arm portion.

7. A sliding arm-rest console assembly as set forth in claim 2 including a handle pivotally connected to said stowage door to move said front latch portion to disengage said console and allow said stowage door to move to said open position.

8. A sliding arm-rest console assembly as set forth in claim 1 wherein said sliding arm-rest includes a substrate disposed over said stowage door and having an elongated channel, said slide guide being disposed in said channel.

9. A sliding am-rest console assembly as set forth in claim 8 wherein said substrate includes a plurality of recesses spaced longitudinally along said channel, said recesses receiving a portion of said slide guide.

10. A sliding arm-rest console assembly as set forth in claim 8 including at least one fastener for attaching a rear portion of said slide guide to said substrate of said sliding arm-rest.

11. A sliding arm-rest console assembly as set forth in claim 1 wherein said stowage door includes a door member disposed over said storage bin and pivotally connected to said console.

12. A sliding arm-rest console assembly as set forth in claim 11 wherein said stowage door includes a lid attached to a bottom surface of said door member for covering said storage bin when said storage door is in said closed position.

13. A sliding arm-rest console assembly for a vehicle comprising:
   a console for attachment to vehicle structure of the vehicle;
   a storage bin disposed within said console and having a cavity to allow objects to be stored therein;
   a stowage door pivotally connected to said console for opening and closing said storage bin in an open position and a closed position;
   a sliding arm-rest disposed over said stowage door to slide between a refracted position over said stowage door and an extended position extending forward relative to said stowage door; and
   a slide guide cooperating with said stowage door having a front latch portion to latch said stowage door to said console in said closed position and a base portion disposed in an elongated channel in said sliding arm-rest to guide movement of said sliding arm-rest along said stowage door between said retracted position and said extended position when said stowage door is in said closed position.

14. A sliding arm-rest console assembly as set forth in claim 13 wherein said front latch portion includes a flange extending outwardly to engage a portion of said console when said stowage door is in said closed position.

15. A sliding arm-rest console assembly as set forth in claim 14 including a handle pivotably connected to said stowage door to move said front latch portion and cause said flange to disengage the portion of said console and allow said stowage door to move to said open position.

16. A sliding arm-rest console assembly as set forth in claim 13 wherein said sliding arm-rest includes a substrate disposed over said stowage door and having said elongated channel.

17. A sliding arm-rest console assembly as set forth in claim 16 wherein said substrate includes a plurality of recesses spaced longitudinally along said channel.

18. A sliding arm-rest console assembly as set forth in claim 17 wherein said slide guide has at least one flexible arm portion with a flange extending outwardly from said at least one flexible arm portion, said flange being disposed in one of said recesses for said retracted position and said extended position.

19. A sliding arm-rest console assembly as set forth in claim 13 wherein said stowage door includes a door member disposed over said storage bin and pivotally connected to said console.

20. A sliding arm-rest console assembly as set forth in claim 19 wherein said stowage door includes a lid attached to a bottom surface of said door member for covering said storage bin when said storage door is in said closed position.

21. A console assembly for a vehicle comprising:

a console for attachment to vehicle structure of the vehicle;

a storage bin disposed within said console and having a cavity to allow objects to be stored therein;

a stowage door pivotally connected to said console for opening and closing said storage bin in an open position and a closed position;

a sliding arm-rest disposed over said stowage door to slide between a retracted position over said stowage door and an extended position extending forward relative to said stowage door, said sliding arm-rest including a substrate disposed over said stowage door and having an elongated channel and a plurality of recesses spaced longitudinally along said channel; and a slide guide cooperating with said stowage door having a front latch portion to latch said stowage door to said console in said closed position and a base portion disposed in said channel to guide movement of said sliding arm-rest along said stowage door between said retracted position and said extended position when said stowage door is in said closed position, said slide guide including at least one flexible arm portion with a flange extending outwardly from said at least one arm portion, said flange being disposed in one of said recesses for said retracted position and said extended position; and a handle pivotally connected to said stowage door to move said latch portion and cause said latch portion to disengage the portion of said console and allow said stowage door to move to said open position.

* * * * *